(12) United States Patent
Ishido et al.

(10) Patent No.: US 9,894,219 B2
(45) Date of Patent: Feb. 13, 2018

(54) MAINTENANCE SYSTEM HAVING IMAGE FORMING APPARATUS AND PORTABLE TERMINAL PERFORMING NEAR FIELD COMMUNICATION WITH IMAGE FORMING APPARATUS

(71) Applicant: KYOCERA Document Solutions Inc., Osaka (JP)

(72) Inventors: Kohei Ishido, Osaka (JP); Kenichi Onishi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/286,386

(22) Filed: Oct. 5, 2016

(65) Prior Publication Data

US 2017/0099397 A1 Apr. 6, 2017

(30) Foreign Application Priority Data

Oct. 5, 2015 (JP) .................................. 2015-197513

(51) Int. Cl.
*H04N 1/00* (2006.01)
*H04N 1/32* (2006.01)

(52) U.S. Cl.
CPC ....... *H04N 1/00087* (2013.01); *H04N 1/0005* (2013.01); *H04N 1/00058* (2013.01); *H04N 1/00307* (2013.01); *H04N 1/32138* (2013.01); *H04N 2201/006* (2013.01); *H04N 2201/0094* (2013.01); *H04N 2201/3205* (2013.01); *H04N 2201/3269* (2013.01); *H04N 2201/3274* (2013.01)

(58) Field of Classification Search
CPC .......................... H04N 1/00087; H04N 1/0005
See application file for complete search history.

(56) References Cited

U.S. PATENT DOCUMENTS

| | | | |
|---|---|---|---|
| 2004/0153651 A1* | 8/2004 | Iida ...................... | B41J 2/17509 713/176 |
| 2006/0165457 A1* | 7/2006 | Hasegawa .............. | G03B 27/46 400/62 |

(Continued)

FOREIGN PATENT DOCUMENTS

| | | |
|---|---|---|
| JP | H08-171329 A | 7/1996 |
| JP | 2003-039805 A | 2/2003 |

*Primary Examiner* — Ibrahim Siddo
(74) *Attorney, Agent, or Firm* — Hawaii Patent Services; Nathaniel K. Fedde; Kenton N. Fedde (57) ABSTRACT

A maintenance system includes an image forming apparatus that performs image formation by a setting depending on the replacement part using a replaceably configured replacement part and a portable terminal that performs near field communication with the portable terminal. The portable terminal includes an image reading part that reads part information of the replacement part from a printed part affixed to the replacement part and a near filed communication part that transmits the part information read by the image reading part via the near filed communication. The image forming apparatus includes a non-contact IC tag in which the part information is written based on power generated from the near filed communication and an reflection processing part that reads the part information from the IC tag at the time of power on and reflects the part information in the setting.

2 Claims, 8 Drawing Sheets

(56) References Cited

U.S. PATENT DOCUMENTS

2009/0210931 A1* 8/2009 Hashimoto ............. G06F 21/35
  726/4
2013/0114100 A1* 5/2013 Torii ................... G06F 11/0733
  358/1.14

* cited by examiner

MAINTENANCE SYSTEM HAVING IMAGE FORMING APPARATUS AND PORTABLE TERMINAL PERFORMING NEAR FIELD COMMUNICATION WITH IMAGE FORMING APPARATUS

INCORPORATION BY REFERENCE

This application is based on and claims the benefit of priority from Japanese Patent Application No. 2015-197513 filed on Oct. 5, 2015, the contents of which are hereby incorporated by reference.

BACKGROUND

The present disclosure relates to a maintenance system having an image forming apparatus that performs image formation based on setting value information using a replaceably configured replacement part and a portable terminal that performs near field communication with the image forming apparatus.

An image forming apparatus has a replaceably configured replacement part such as a photosensitive drum and a toner container. In order for the image forming apparatus to recognize a replacement part, it has been proposed heretofore a technology of previously affixing a seal on which a setting value is printed to a replacement part, inputting the setting value by a serviceman in the image forming apparatus while looking at the seal, providing a memory in which an identification number is stored the replacement part, and reading the identification number by the image forming apparatus from the memory at the time of mounting thereof.

SUMMARY

According to one aspect of the present disclosure, the present disclosure provides a maintenance system having an image forming apparatus that performs image formation by a setting depending on a replaceably configured replacement part using the replacement part and a portable terminal that performs near field communication with the image forming apparatus. The portable terminal includes an image reading part that reads part information of the replacement part from a printed matter affixed to the replacement part; and a near field communication part that transmits the part information read by the image reading part via the near field communication; and the image forming apparatus includes: an noncontact IC tag in which the part information is written based on power generated from the near field communication; and a reflection processing part that reads the part information from the IC tag at the time of power on and reflects the part information in the setting.

DETAILED DESCRIPTION

Figure 1:
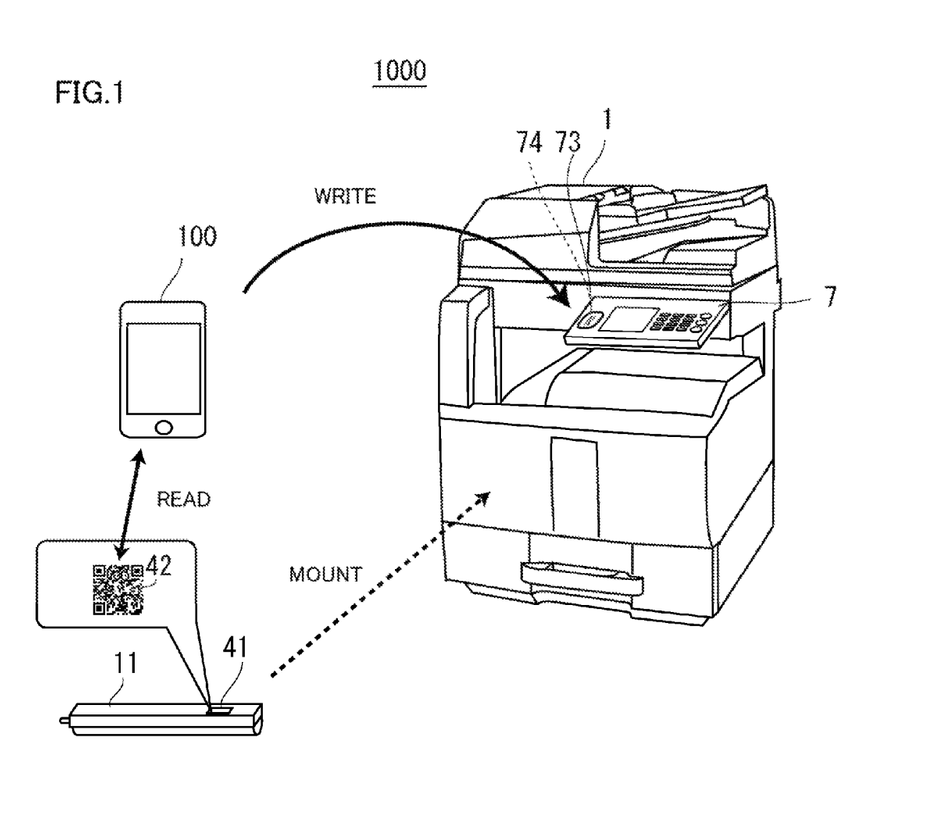
FIG. 1 is a system configuration diagram of a maintenance system according to one embodiment of the present disclosure.

Hereinafter, a description will be given to an overview of a maintenance system 1000 according to one embodiment of the present disclosure. The maintenance system 1000 includes an image forming apparatus 1 in which an IC tag 74 is embedded in an operation part 7 and on which an N mark indicating a position at which the IC tag 74 is embedded is displayed, and a portable terminal 100 that performs reading and writing from/to the IC tag 74 via near field communication such as a NFC (Near Field Communication) or the like. Further, a seal 41 on which a two-dimensional code 42 indicating part information is printed is affixed to a photosensitive drum 11 that is a replacement part of the image forming apparatus 1. The photosensitive drum 11 has a charging characteristic. The Image forming apparatus 1 has an image quality improved by image formation depending on the charging characteristic. Therefore, the charging characteristic of the photosensitive drum 11 is previously measured in a production line, a setting value depending on the charging characteristic is encoded into a two-dimensional code 42 as part information, and affixed to the photosensitive drum 11. In this context, the part information which is encoded into the two-dimensional code 42 may be a correction value and identification information to identify a replacement part, or may be these plural information, not only the setting value of the charging characteristic.

The portable terminal 100 acquires part information by reading the two-dimensional code 42, and writes the part information in the IC tag 74 embedded at a position indicated by the N mark 73 when the portable terminal 100 is touched the N mark 73. When the photosensitive drum 11 is mounted on the image forming apparatus 1 and power is turned on, the image forming apparatus 1 reads the part information from the IC tag 74 and reflects the part information as part information of the photosensitive drum 11. Therefore, according to the present embodiment, the embodiment eliminates the need to manually input the part information by a serviceman, thereby preventing a mistype. Further, the part information has only to be printed on a seal 41 as the two-dimensional code 42 and affixed to the photosensitive drum 11, and thus the photosensitive drum 11 may dispense with a memory, thereby preventing an increase in cost of the replacement part.

Hereinafter, a detailed description will be given to an embodiment of the present disclosure with reference to the accompanying drawings. In the following embodiment, a configuration exerting the same function is denoted by the same reference numeral.

Figure 2:
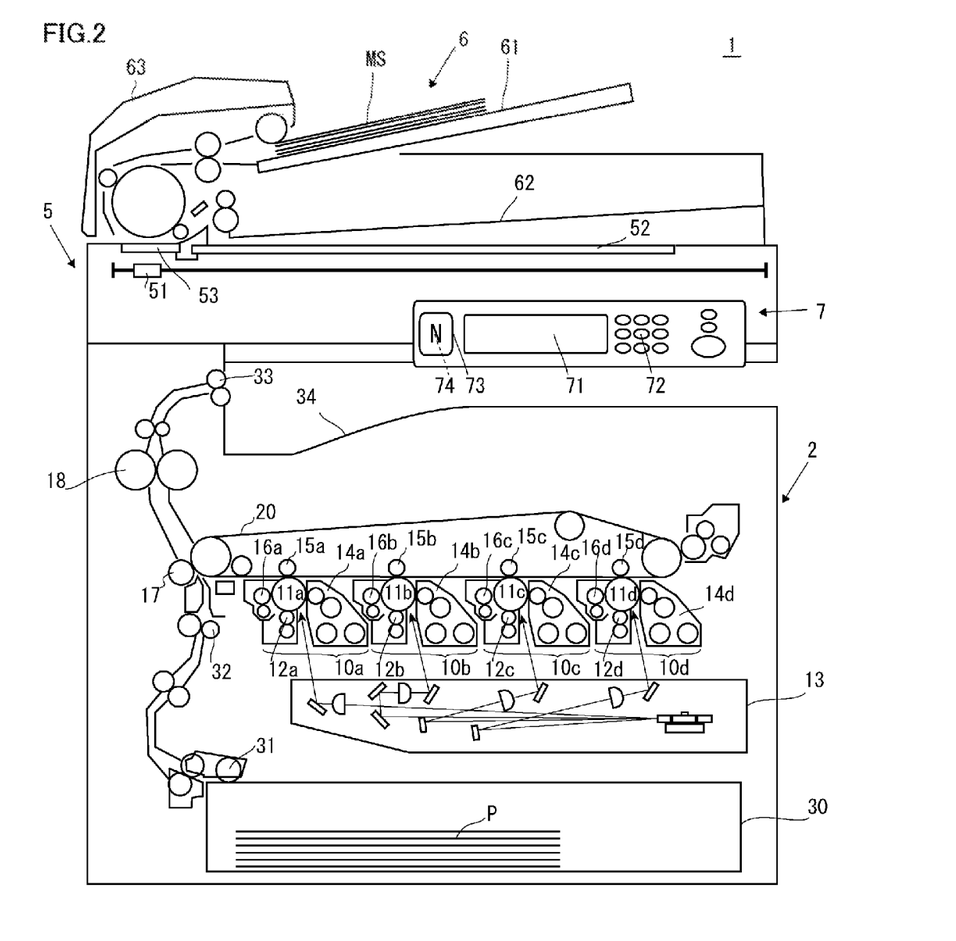
FIG. 2 is a schematic cross-sectional view of an image forming apparatus shown in FIG. 1.

The image forming apparatus 1 is a device that has an image forming function such as a printer, a copying machine, and a MFP (Multifunction Peripheral/Printer/Product), or the like. Referring to FIG. 2, the image forming apparatus 1 includes a main body part 2, a document reading part 5, a document feeding part 6, and an operation part 7. The document reading part 5 is arranged on an upper part of the main body part 2, and the document feeding part 6 is arranged on an upper part of the document reading part 5. Further, the operation part 7 is arranged at a front side of the image forming apparatus 1.

The operation part 7 is provided with a display part 71 and a ten key 72. A user operates the operation part 7 to input an instruction, thereby performing various settings of the image forming apparatus 1, and executing various functions such as image formation, or the like. The display part 71 is display means such as a liquid crystal display panel that displays a state of the image forming apparatus 1, an image formation situation, and the number of print copies, and is configured to be able to perform various instructions for color printing, monochrome printing, and duplex printing, or the like, and various settings such as a magnification setting, a density setting, or the like as a touch panel on a surface of the liquid crystal panel on which a transparent pressure sensor is provided.

Further, the operation part 7 has the non-contact IC tag 74 embedded therein, and conforms to near filed communication such as a NFC, or the like. At a position where the IC tag 74 is embedded, an N mark 73 is provided to become aware of where the portable terminal 100 should be touched. The IC tag 74 is a passive tag having an IC chip and a coil-shaped antenna, and activated by power generated from an electric wave from the portable terminal 100. Further, the IC chip stores in its memory an app invocation command to command the portable terminal 100 to invocate a guidance APP 131 to be described later. In this connection, the IC tag 74 and the N mark 73 have only to be provided at a position of the image forming apparatus 1 at which the portable terminal 100 is touchable not apply only to the operation part 7.

The document reading part 5 includes a scanner 51, a platen glass 52, and a document reading slit 53. The scanner 51 is composed of a LED (Light Emitting Diode) and a CCD (Charge Coupled Device) sensor, or the like, and is configured to be movable in a feeding direction of a document MS by the document feeding part 6. The platen glass 52 is a document table made of a transparent member such as a glass, or the like. The document reading slit 53 has a slit formed in a direction orthogonal to a conveying direction of the document MS by the document feeding part 6.

In a case where a document mounted on the platen glass 52 is read, the scanner 51 is moved to a position opposite to the platen glass 52, captures image data by reading the document while scanning the document mounted on the platen glass 52, and outputs the captured image data to the main body part 2. Further, in a case where the document MS conveyed by the document feeding part 6 is read, the scanner 51 is moved to a position opposite to the document reading slit 53, captures image data by reading the document MS in synchronization with an conveying operation of the document MS by the document feeding part 6, and outputs the captured image data to the main body part 2.

The document feeding part 6 includes a document mounting part 61, a document discharging part 62, and a document conveying mechanism 63. The document MS mounted on the document mounting part 61 is delivered in order one by one by the document conveying mechanism 63 to a position opposite to the document reading slit 53. After that, the MS document is discharged into the document discharging part 62. In this connection, the document feeding part 6 is configured to be tiltable and can open an upper surface of the platen glass 52 by lifting upwardly the document feeding part 6.

In the main body part 2, four image forming parts 10a, 10b, 10c and 10d are arranged, which respectively correspond to image data of different four colors C (cyan), M (Magenta), Y (Yellow), and K (Black). Further, an intermediate transfer belt 20 is provided adjacent to the four image forming parts 10a, 10b, 10c, and 10d. In the four image forming parts 10a, 10b, 10c, and 10d, there are respectively provided photosensitive drums 11a, 11b, 11c, and 11d carrying a visible image (toner image) of each color. A toner image formed on the photosensitive drums 11a, 11b, 11c, and 11d is transferred in order on the intermediate transfer belt 20 moving while abutting on the photosensitive drums 11a, 11b, 11c, and 11d. The toner image transferred in order on the intermediate belt 20 is transferred at one time on a recording paper P at a secondary transfer roller 17. The recording paper P is stored in a paper cassette 30 in a lower part of the main body part 2, and conveyed to the secondary transfer roller 17 through a feeding roller 31 and a resist roller 32. A toner image transferred on the recording paper P is fixed on the recording paper P in a fixing device 18, and the recording paper P on which printing is applied is discharged into a discharging tray 34 from the main body through a discharging roller 33.

Around the photosensitive drums 11a, 11b, 11c, and 11d each rotatably arranged in the four image forming apparatuses 10a, 10b, 10c, and 10d, there are provided charging devices 12a, 12b, 12c, and 12d that respectively charge the photosensitive drums 11a, 11b, 11c, and 11d, an exposure unit 13 that respectively exposes image information on the photosensitive drums 11a, 11b, 11c, and 11d, developing devices 14a, 14b, 14c, and 14d that respectively form a toner image on the photosensitive drums 11a, 11b, 11c, and 11d, primary transfer rollers 15a, 15b, 15c, and 15d that respectively transfer a toner image formed on the photosensitive drums 11a, 11b, 11c, and 11d on the intermediate transfer belt 20, and cleaning devices 16a, 16b, 16c, and 16d that clean a developing powder(toner) remained on the photosensitive drums 11a, 11b, 11c, and 11d. Further, in the main body part 2, there are provided toner containers 21a, 21b, 21c, and 21d each supplying a toner to the four image forming apparatuses 10a, 10b, 10c, and 10d. In the toner containers 21a, 21b, 21c, and 21d, four color toners C(cyan), M(magenta), Y(yellow), and K(black) are accommodated each being supplied to the four charging devices 14a, 14b, 14c, and 14d.

The photosensitive drums 11a, 11b, 11c, and 11d, the toner containers 21a, 21b, 21c, and 21d, the developing devices 141, 14b, 14c, and 14d, the exposure unit 13, the fixing unit 18, and the like are configured to be detachable (replaceable) to/from the main body part 2, and replacement parts to be replaced in a maintenance work, or the like, if necessary. In the present embodiment, a description will be given by taking a case as an example where the photosensitive drums 11a, 11b, 11c, and 11d are replaced in a maintenance work. Note that, in the following, as far as it is not necessary to separately explain the photosensitive drums 11a, 11b, 11c, and 11d, a description will be given as the photosensitive drum 11, for the sake of simplicity.

Figure 3:
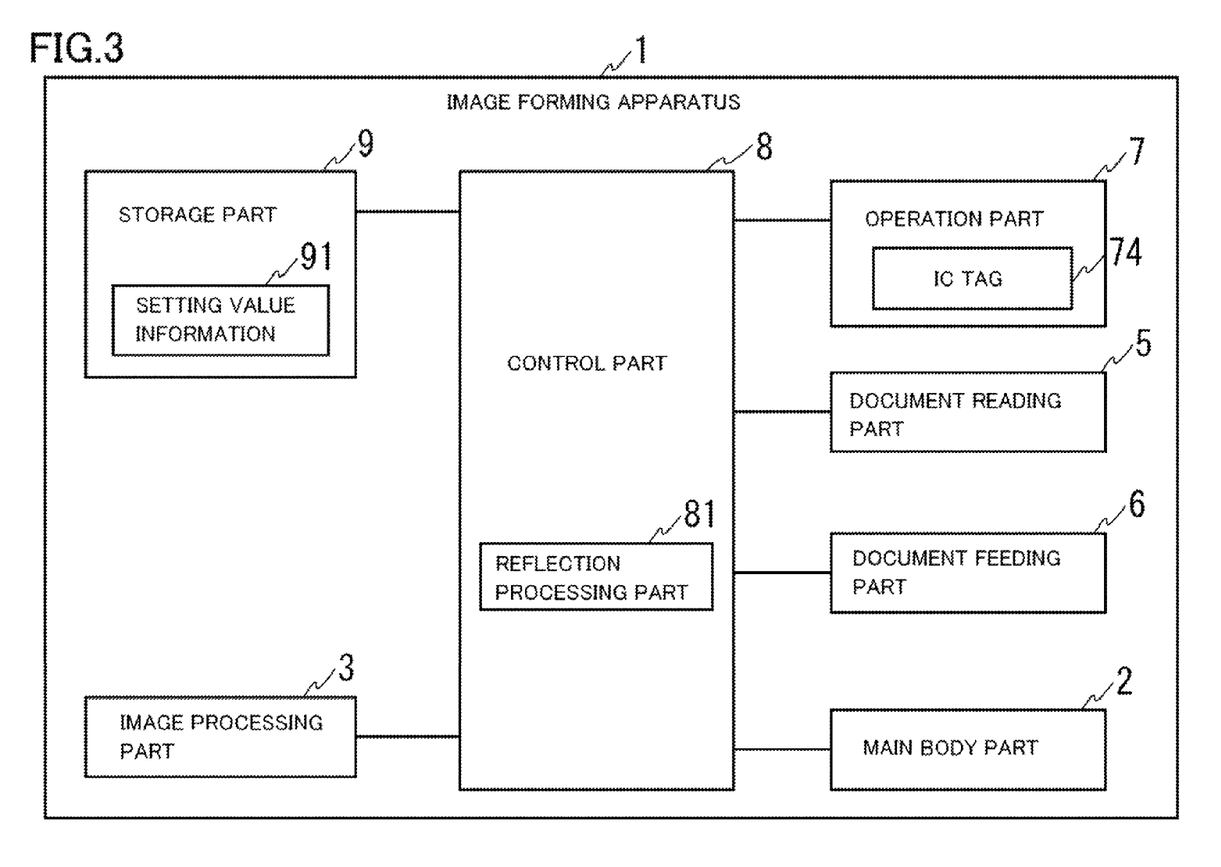
FIG. 3 is a functional block diagram showing a configuration of the image forming apparatus shown in FIG. 1.

FIG. 3 is a functional block diagram showing an outline configuration of the image forming apparatus 1 of the present embodiment. The image forming apparatus 1 includes a storage part 9, and a control part 8 connected to an image processing part 3. The control part 8 is an information processing part such as a microcomputer including a CPU (Central Processing Unit), a ROM (Read Only Memory), a RAM (Random Access Memory), or the like. The ROM stores a control program to perform operation control of the image forming apparatus 1. The control part 8 reads the control program stored in the ROM, and controls each component (image reading part 5, document feeding part 6, image forming parts 10a, 10b, 10c, and 10d of the main body part 2, the intermediate transfer belt 20, the fixing unit 18, or the like) in accordance with specific instruction information input from the operation part 7 by developing the control program on the RAM, thereby implementing a series of image forming operations based on the setting value information 91 stored in the storage part 9.

Further, the control part 8 functions as a reflection processing part 81 that reads part information of the replacement part (photosensitive drum 11) stored in the IC tag and reflects the part information in setting value information 91 in the storage part 9.

The image processing part 3 is means for performing specific image processing to the image data, and performs, for example, image quality improving processing such as scaling processing, temperature adjustment, and gradation adjustment.

The storage part 9 is storage means such as a semiconductor memory, a HDD (Hard Disk Drive), or the like, and accumulates the image data. Further, the storage part 9 stores the setting value information 91 where part information of the replacement part is registered. In accordance with a setting of the setting value information 91, the control part 8 controls an image forming operation using a replacement part. As part information, a setting value depending on charging characteristics of each of the photosensitive drums 11a, 11b, 11c, and 11d, and an identification number each of the toner containers 21a, 21b, 21c, and 21d are registered.

Figure 4:
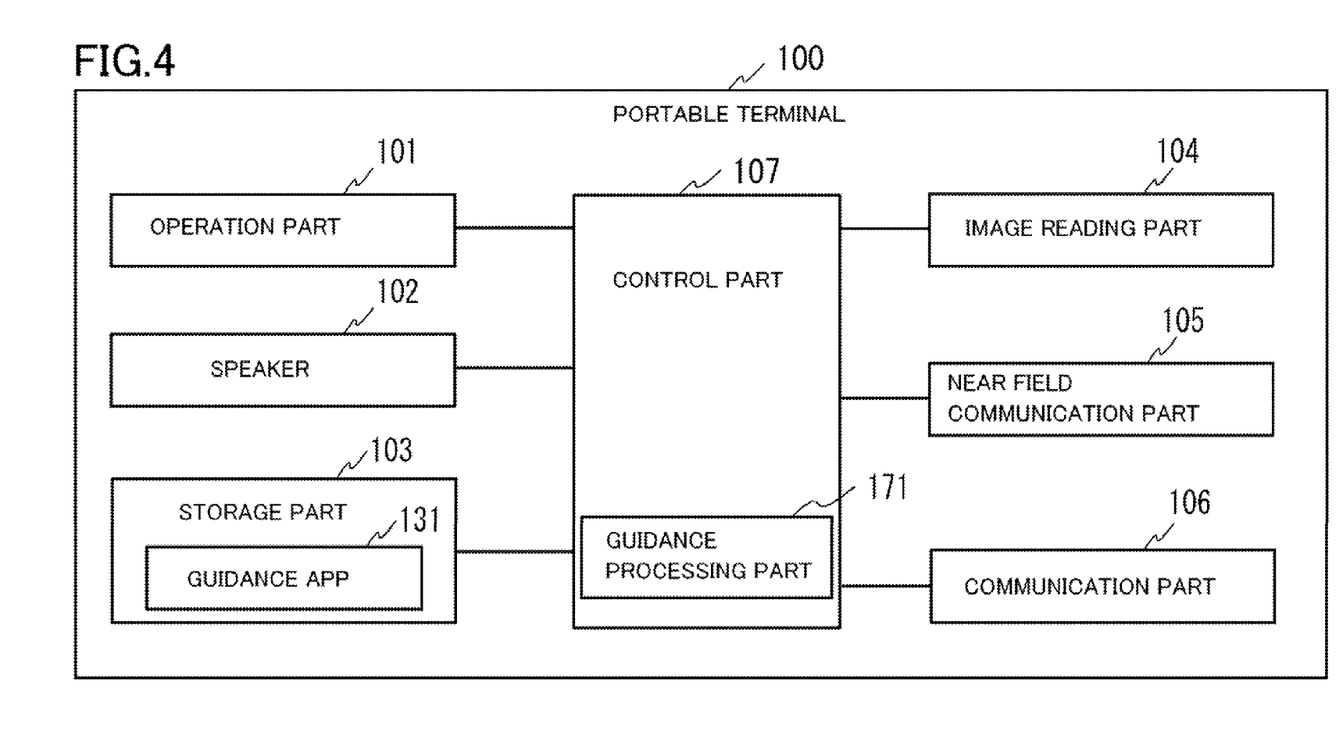
FIG. 4 is a functional block diagram showing a configuration of a portable terminal shown in FIG. 1.

Referring to FIG. 4, the portable terminal 100 includes an operation part 101, a speaker 102, a storage part 103, an image reading part 104, a near field communication part 105, a communication part 106, and a control part 107. The portable terminal 100 is a portable device such as a cellular phone, a smartphone, a tablet terminal, a PDA (Personal Digital Assistance), or the like.

The operation part 101 is a user interface with a display part that displays various information and various operation keys. The display part may be a touch panel that functions as display means provided on a surface of the display panel with a transparent pressure sensitive sensor and input means.

The speaker 102 includes an amplifier and has a voice outputting function.

The storage part 103 is storage means such as a semiconductor memory and a HDD (Hard Disk Drive), or the like, and stores a guidance APP 131. The guidance APP 131 is an application program implementing a guidance function such as a maintenance work.

The image reading part 104 has a function of reading a two-dimensional code 42 affixed to the replacement part, and outputting the part information indicated by the two-dimensional code 42 to the control part 107. Here, the two-dimensional code 42 is a bar code and a QR code (registered trademark). Alternatively, a seal 41 on which part information itself is printed may be affixed to the replacement part instead of the two-dimensional code 42, and the image reading part 104 may read the part information itself from the seal 41.

The near field communication part 105 is means for performing proximity wireless communication, and has a reader/writer function of reading and writing various information by performing wireless communication with the IC tag 74 when the portable terminal 100 touches the N mark 73. Alternatively, when the portable terminal is held over the N mark 73, wireless communication may be performed between the IC tag 74 and the portable terminal 100, instead of touch.

The communication part 106 has a function of transmitting and receiving various data via a wireless network such as a Wi-Fi and a 3G network.

The control part 107 is respectively connected to the operation part 101, the speaker 102, the storage part 103, the image reading part 104, the near field communication part 105, and the communication part 106, and performs operation control of the whole portable terminal 100 in accordance with specific instruction information input from the operation part 101. The control part 107 is an information processing part such as a microcomputer with a ROM (Read Only Memory), a RAM (Random Access Memory), or the like. The ROM stores a control program to perform operation control of the portable terminal 100. The control part 107 reads the control program stored in the ROM, and controls the whole terminal in accordance with specific instruction information input from the operation part 101 by developing the control program on the RAM.

Further, the control part 107 functions as a guidance processing part 171 that gives guidance for a maintenance work by developing the guidance APP 131 on the RAM. The guidance processing part 171 has a function of displaying a guidance screen indicating a procedure of a maintenance work on the operation part 101, and assisting the maintenance work by a serviceman in accordance with the guidance screen.

A detailed description will be specifically given to a flow of a maintenance work in the maintenance system 1000 with reference to FIG. 5 to FIG. 8.

Figure 5:
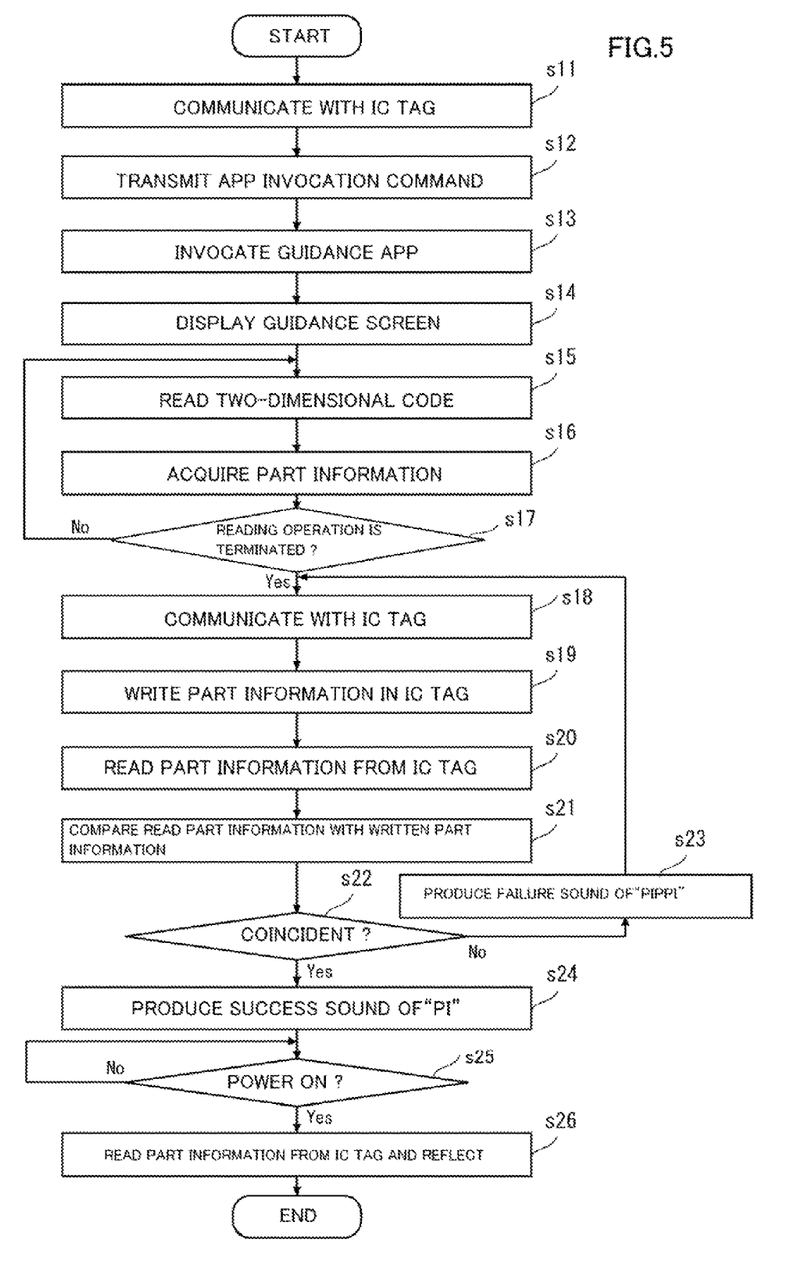
FIG. 5 is a flowchart showing a flow of maintenance system processing shown in FIG. 1.

First, a serviceman who carrying the portable terminal 100 touches the N mark 73. As shown in FIG. 5, thereby, communication is performed between the portable terminal 100 and the IC tag 74 (step S11). The IC tag 74 generates an electromotive force generated from an electric wave from the near field communication part 105, and transmits an app invocation command stored in the IC chip to the portable terminal 100 (step S12). Once an app invocation command is transmitted, the control part 107 of the portable terminal 100 executes the guidance APP 131 stored in the storage part 103, and invokes a guidance app (step S13). This enables the control part 107 to function as a guidance processing part 171.

Subsequently, the guidance processing part 171 displays a guidance screen to give an instruction for a maintenance work on the operation part 101 both in image and in writing (step S14).

Figure 6:
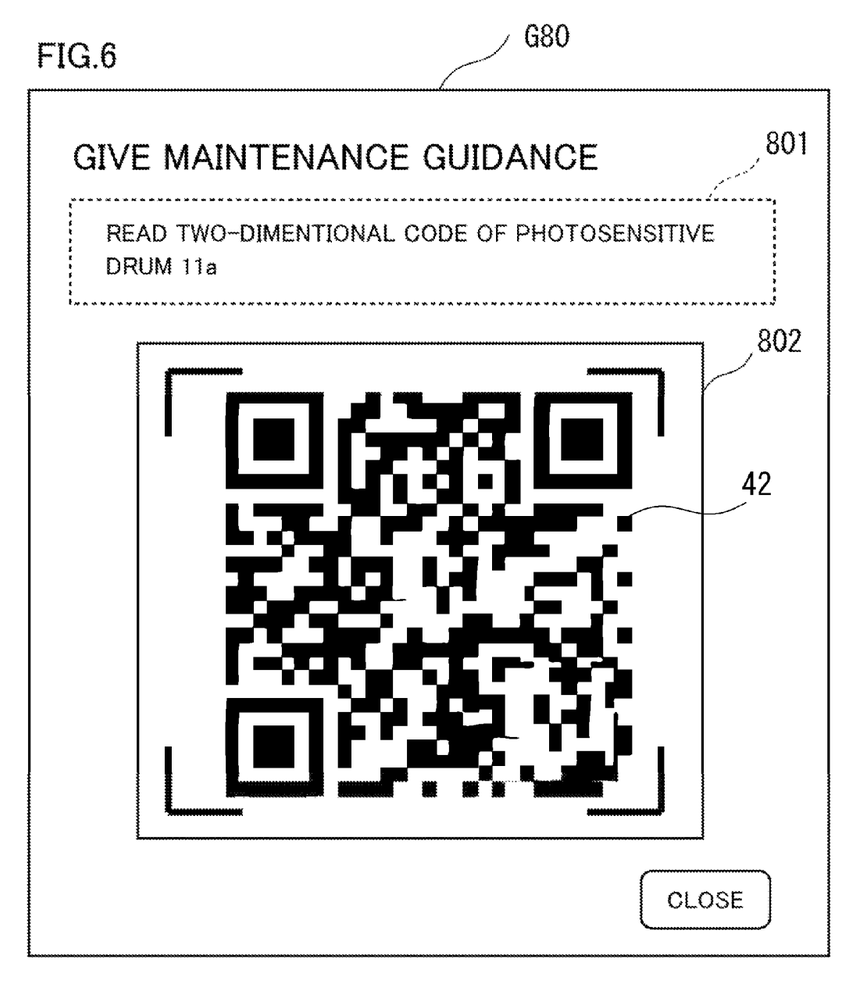
FIG. 6 is an example of a guidance screen to be displayed on an operation part shown in FIG. 4.
Figure 7:
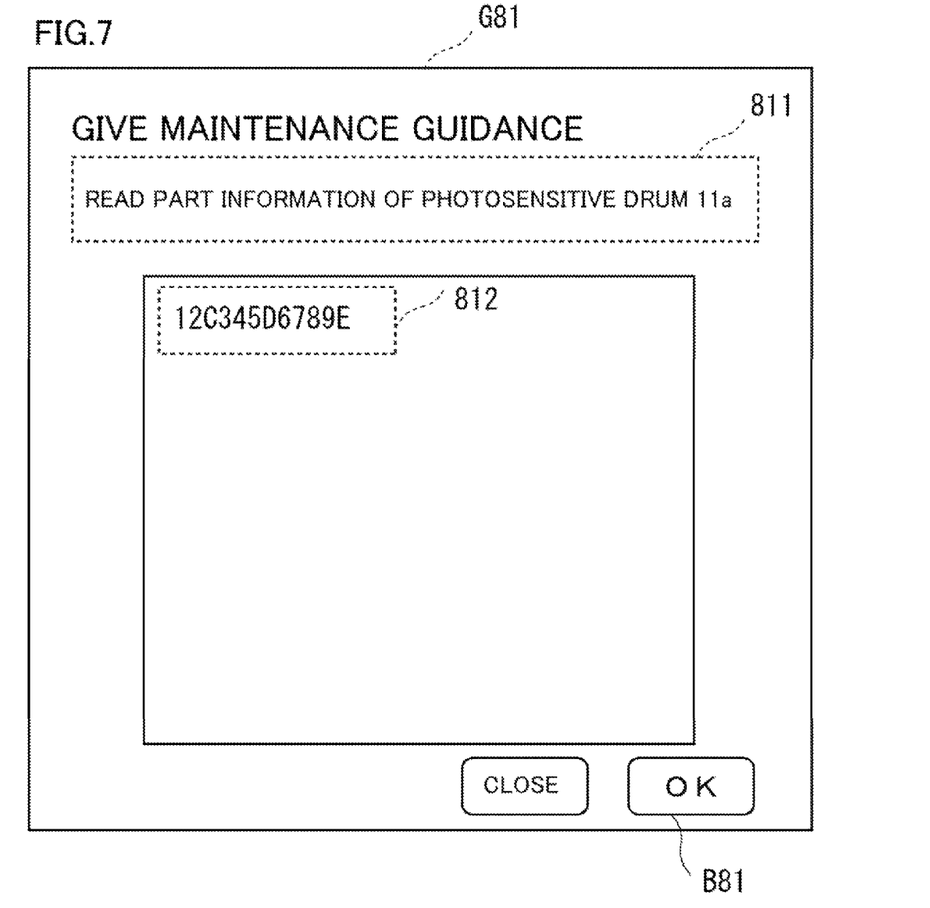
FIG. 7 is an example of a guidance screen to be displayed on the operation part shown in FIG. 4.

As shown in FIG. 6, first, the guidance processing part 171 displays a guidance screen G80 on which a reading frame 802 to read the secondary code 42, together with guidance 801 that "read two-dimensional code of the photosensitive drum 11a". At this time, an image indicating where in the two-dimensional drum 11a the two-dimensional code 42 is affixed may be displayed together on the guidance screen G80. When the two-dimensional code 42 affixed to the photosensitive drum 11a is projected within the reading frame 802, the two-dimensional code 42 is read by the image reading part 104, and the part information 812 corresponding to the two-dimensional code 42 is acquired. Then, as shown in FIG. 7, guidance 811 indicating to the effect that the part information 812 is read by the guidance processing part 171, and a guidance screen G81 on which the part information 812 is displayed are displayed. When an "OK" button B81 provided in the guidance screen G81 is pressed, the guidance processing part 171 acquires the part information 812 as part information of the photosensitive drum 11a.

Figure 8:
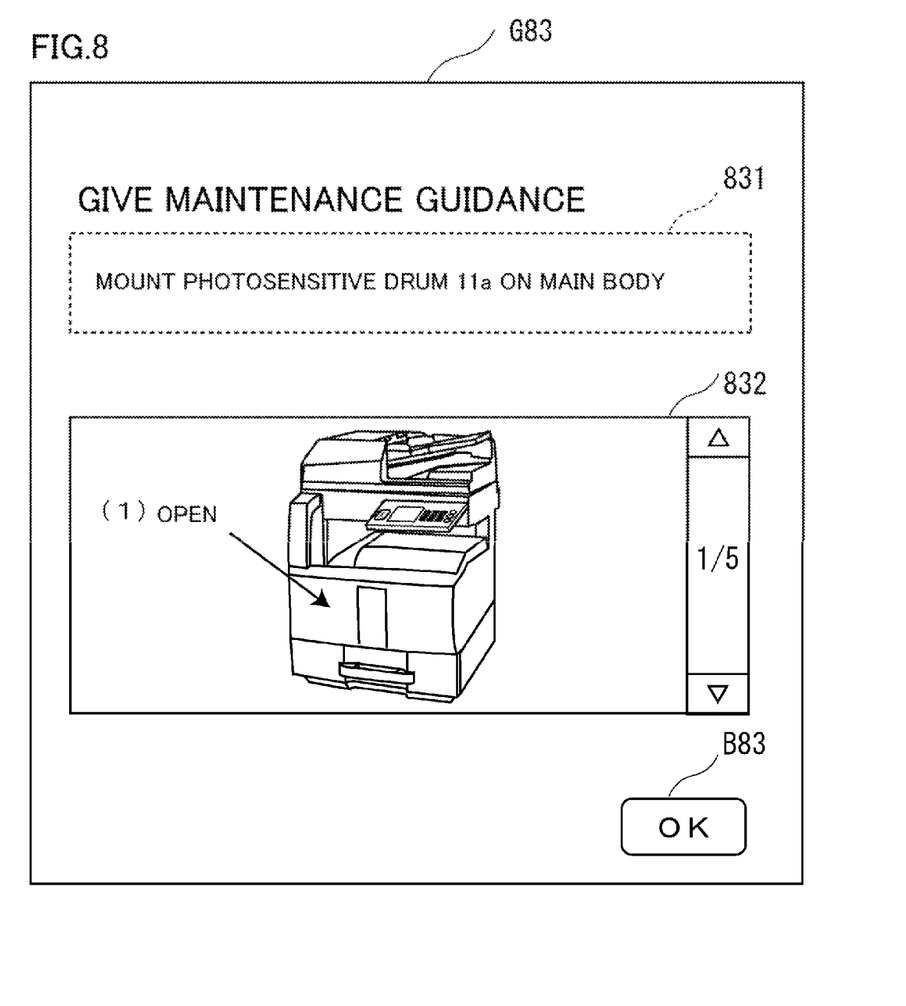
FIG. 8 is an example of a guidance screen to be displayed on the operation part shown in FIG. 4.

Then, as shown in FIG. 8, by the guidance processing part 171, a guidance 831 indicting that "mount the photosensitive drum 11a on the main body", an image displaying area 832 in which an image indicating a procedure of mounting the photosensitive drum 11a on the main body part 2, and the "OK" button B83 are displayed. When a serviceman mounts the photosensitive drum 11a on the main body part 2 in accordance with the guidance screen G83 and presses the "OK" button B81, then, guidance to the photosensitive drum 11b is given in the same way as the photosensitive drum 11a.

In this way, the guidance processing part 171 reads in order the two-dimensional code 42 respectively affixed to the photosensitive drums 11a, 11b, 11c, and 11d (step S15), acquires the part information 812 corresponding to the two-dimensional code 42 (step S16), and repeats processing from step S15 to step S17 until an reading operation of the part information 812 to all the photosensitive drums 11a, 11b, 11c, and 11d is terminated (step S17:No).

If the reading operation is terminated (step S17:Yes), the guidance processing part 171 displays a guidance screen on which guidance that "make a portable terminal touch an N mark", "an operation is completed when a pip sound is produced", and "retouch an N mark when a pippi sound is produced" are displayed. If a serviceman makes the portable terminal 100 touch the N mark 73 in accordance with a guidance screen, communication is established between the portable terminal 100 and the IC tag 74 (step S18), and the guidance processing part 171 writes the part information 812 of each of the photosensitive drums 11a, 11b, 11c, and 11d in the IC tag 74 through the near field communication part 105 (step S19). This allows the plural part information 812 to be written in a lump in the IC tag 74. Further, because the IC tag 74 is a passive tag, it becomes possible for the part information 812 to be written even if the image forming apparatus 1 is turned off, thereby proceeding an effective maintenance work.

Subsequently, the guidance processing part 171 reads the part information 812 of each of the photosensitive drums 11a, 11b, 11c, and 11d from the IC tag 74 (sep S20), and compares each of the read part information 812 with each of the written part information 812 (step S21).

As a result of comparison, if they are not coincident with each other (step S22:No), the guidance processing part 171 produces a failure sound of "pippi" from the speaker 102 (step S23), and the processing is returned back to step S18. In other words, when the guidance processing part 171 writes the part information 812 in the IC tag 74, reads the part information 812 from the IC tag 74, compares the written part information 812 with the read part information 812, functions as a determination part that determines whether or not the part information 812 is correctly written, and the determination result is output from the speaker 102 that functions as an output part. Therefore, if it is a case where the part information 812 is not correctly written in the IC tag 74 due to an insufficient touch of the portable terminal 100, the guidance processing part 171 enables a serviceman to retouch the portable terminal 100 and rewrite the part information 812 in the IC tag 74. Further, the embodiment enables a determined result to be notified even when the image forming apparatus 1 is turned off by outputting the determined result from the speaker 102 of the portable terminal 100.

Otherwise, if they are coincident with each other (step 22:Yes), the guidance processing part 171 produces a success sound of "pi" from the speaker 102 (step 24), and displays a guidance screen on which guidance that "settings are applied at the time of power on. Turn on a power supply if you want to set as soon as possible" is displayed on the operation part 101.

The image forming apparatus 1 waits until the power turns on (step 25, step 25:No). If a serviceman turns on the power of the image forming apparatus 1 in accordance with the guidance screen (step 25:Yes), the reflection processing part 81 reads the part information 812 from the IC tag 84, reflects the part information 812 in the setting value information 91 of the storage part 9(step S26), and the processing is terminated.

This allows the image forming apparatus 1 to perform image formation based on the setting value information 91 in which each of the part information 812 of the photosensitive drums 11a, 11b, 11c, and 11d is reflected. Further, because a series of maintenance procedures are displayed in accordance with the guidance screen, even a serviceman who has poor experience in maintenance can perform a maintenance work. Furthermore, because each serviceman performs evenly a maintenance work in accordance with a maintenance procedure of the guidance screen, it ensures a constant maintenance quality.

In this way, the maintenance system 1000 includes the image forming apparatus 1 that performs image formation by the settings depending on a replacement part using the replacement part configured to be replaceable and the portable terminal 100 that performs near field communication with the image forming apparatus 1. The portable terminal 100 includes the image reading part 104 that reads the part information 812 of a replacement part from a printed matter (seal 41) affixed to the replacement part and the near field communication part 105 that transmits the part information 812 read by the image reading part 104 via the near field communication. The image forming apparatus 1 includes the non-contact IC tag 74 in which the part information 812 is written based on power generated from the near field communication and the reflection processing part 81 that reads the part information 812 from the IC tag 74 at the time of power on and reflects the part information 812 in the setting value information 91. Therefore, it eliminates the need for a serviceman to manually input the part information 81 of the replacement part in the image forming apparatus 1, thereby securely preventing at a low price the deterioration of an image quality due to settings of an incorrect setting value. Further, because the part information is written in the non-contact IC tag 74 based on the power of near field communication, a maintenance work can be performed in a state where the power of the image forming apparatus 1 is turned off, thereby allowing the settings to be reflected when the power of the image forming apparatus 1 is turned on.

Further, the IC tag 74 stores an app invocation command to command the portable terminal 100 to invoke a guidance APP131 implementing a guidance function of the maintenance work. When the portable terminal 100 touches the N mark 73, the portable terminal 100 reads an app invocation command from the IC tag 74 via the near field communication, invokes the guidance APP 131, and starts guidance for a maintenance work. Therefore, even a serviceman who has poor experience in maintenance can start a maintenance work using the guidance function merely by making the portable terminal 100 touch the N mark 73.

Moreover, when the guidance processing part 171 writes the part information 812 in the IC tag 74, the guidance processing part 171 functions as a determination part that reads the part information 812 from the IC tag 74, compares the part information 812 written in the IC tag 74 and the part information 812 read from the IC tag 74, determines whether or not the part information 812 is correctly written, and outputs a determined result from the speaker 102. It is liable that in case of a serviceman who has poor experience in maintenance, the part information 812 is not correctly written in the IC tag 74 due to insufficient touch. Therefore, if a check is made by the guidance processing part 171 to confirm whether or not the part information 812 is correctly written in the IC tag 74. If the part information 812 is not correctly written in the IC tag 74, it enables the portable terminal to retouch the N mark 73, thereby writing the part information 812 in the IC tag 74.

Encoding the part information 812 into the two-dimensional code 42 allows the far more part information 812 to be printed on the seal 41, with space saved, as compared with a case where the part information 812 is simply printed previously on the seal 41.

In a typical technology, there is a problem that because a serviceman manually inputs a setting value, it is liable to be set an erroneous value caused by an input error, and to cause degradation of image quality. Further, in a technology where a replacement part is provided with a memory in which an identification number is stored, there is a problem that because it is necessary to provide the memory in which the identification number is stored for each of the replacement parts, a cost of the replacement part soars. Thus, it has been longing for the advent of an inexpensive and secure technology of reflecting part information of a replacement part in the image forming apparatus.

The present disclosure is made in view of the above problem, and an object thereof is to provide an inexpensive and secure technology of reflecting part information of a replacement part in the image forming apparatus.

According to the present disclosure, the disclosure can provide an inexpensive and secure technology of reflecting the part information of the replacement part in the image forming apparatus.

While in the present embodiment, a description is made by taking a case as an example where the part information 812 of the replacement part is encoded into the two-dimensional code 42, not necessarily limited thereto, identification information (for example, serial number, product number, or the like) for identifying a replacement part as the part information 812 of the replacement part may be encoded into the two-dimensional code 42 and printed on the seal 41. In this case, a database server in which detailed part information (setting value of charging characteristics, or the like) is stored correspondingly with the identification information is provided in a network, and an IP address of the database server is previously stored in a IC chip of the IC tag 74. The guidance processing part 171 reads the identification information from a replacement part via the image reading part 104, and when the portable terminal 100 touches the N mark 73, acquires an IP address of the database server from the IC tag 74. Then, the portable terminal 100 gets access to the database server based on the IP address via the communication part 106, acquires detailed part information corresponding to the identification information from the database server, and writes the detailed part information in the IC tag 74. Thereby, since the detailed part information corresponding to the identification information is acquired from the database server via the network and writes the detailed part information in the IC tag 74 as part information, it enables far more part information to be reflected in the image forming apparatus 1.

It goes without saying that the present disclosure is not necessarily limited to the aforesaid embodiment, rather the disclosure may be modified in various ways within a range not departing from the spirit of the present disclosure. For example, the present embodiment may be applied to a case where a replacement part is attached to the main body part 2 in a production line, not only in a maintenance work by a serviceman.

What is claimed is:

1. A maintenance system having an image forming apparatus that performs image formation by a setting depending on a replaceably configured replacement part using the replacement part and a portable terminal that performs near field communication with the image forming apparatus,
   wherein the portable terminal comprises:
   an image reading part that reads part information of the replacement part from a printed matter affixed to the replacement part; and
   a near field communication part that transmits the part information read by the image reading part via the near field communication; and
   the image forming apparatus comprises:
   a non-contact IC tag in which the part information is written based on power generated from the near field communication; and
   a reflection processing part that reads the part information from the IC tag at the time of power on and reflects the part information in the setting,
   wherein the IC tag stores an app invocation command to command the portable terminal to invoke an application program implementing a guidance function of a maintenance work,
   wherein the portable terminal comprises: a storage part that stores the application program, and
   wherein when the portable terminal touches an embedded position of the IC tag of the image forming apparatus, the portable terminal reads the app invocation command from the IC tag via the near field communication, invokes the application program, and starts guidance for the maintenance work.

2. A maintenance system having an image forming apparatus that performs image formation by a setting depending on a replaceably configured replacement part using the replacement part and a portable terminal that performs near field communication with the image forming apparatus,
   wherein the portable terminal comprises:
   an image reading part that reads part information of the replacement part from a printed matter affixed to the replacement part; and
   a near field communication part that transmits the part information read by the image reading part via the near field communication; and
   the image forming apparatus comprises:
   a non-contact IC tag in which the part information is written based on power generated from the near field communication; and
   a reflection processing part that reads the part information from the IC tag at the time of power on and reflects the part information in the setting,
   wherein identification information to identify the replacement part as the part information is printed on the printed matter affixed to the replacement part,
   wherein the maintenance system further comprises a database server that is connected to a network and stores detailed part information correspondingly with the identification information of the replacement part,
   wherein the IC tag stores an IP address of the database server,
   wherein the portable terminal further comprises a communication part that acquires the detailed part information from the database server via the network based on the IP address, and
   wherein the near field communication part, when the portable terminal touches an embedded position of the IC tag in the image forming apparatus, acquires the IP address from the IC tag, and writes the detailed part information acquired from the database server as the part information in the IC tag based on the IP address through the communication part.

* * * * *